United States Patent
Haupt et al.

(10) Patent No.: US 10,850,494 B2
(45) Date of Patent: Dec. 1, 2020

(54) POWDER APPLICATION ARRANGEMENT COMPRISING A CAMERA

(71) Applicant: SLM Solutions Group AG, Luebeck (DE)

(72) Inventors: Benno Haupt, Luebeck (DE); Arne Neef, Luebeck (DE); Dieter Schwarze, Luebeck (DE); Toni Adam Krol, Luebeck (DE)

(73) Assignee: SLM SOLUTIONS GROUP AG, Luebeck (DE)

( * ) Notice: Subject to any disclaimer, the term of this patent is extended or adjusted under 35 U.S.C. 154(b) by 648 days.

(21) Appl. No.: 15/297,800

(22) Filed: Oct. 19, 2016

(65) Prior Publication Data
US 2017/0113449 A1 Apr. 27, 2017

(30) Foreign Application Priority Data

Oct. 21, 2015 (EP) .................................... 15190791

(51) Int. Cl.
*B33Y 30/00* (2015.01)
*B33Y 40/00* (2020.01)
(Continued)

(52) U.S. Cl.
CPC ............ *B33Y 30/00* (2014.12); *B22F 3/1055* (2013.01); *B29C 64/153* (2017.08); *B33Y 10/00* (2014.12);
(Continued)

(58) Field of Classification Search
CPC ........... B22F 2003/1056; B22F 3/1055; B28B 1/001; B29C 64/153; B33Y 10/00; B33Y 30/00; Y02P 10/295
(Continued)

(56) References Cited

U.S. PATENT DOCUMENTS

| 2004/0133298 A1 | 7/2004 | Toyserkani et al. |
| 2004/0173946 A1 | 9/2004 | Pfeifer et al. |

(Continued)

FOREIGN PATENT DOCUMENTS

| CN | 101642810 A | 2/2010 |
| DE | 10148967 A1 | 4/2002 |

(Continued)

OTHER PUBLICATIONS

Translation of Japanese Examination Report, Application No. JP2016-204771, dated Jan. 10, 2018, 4 pages.

(Continued)

*Primary Examiner* — Alexander M Weddle
(74) *Attorney, Agent, or Firm* — Taft Stettinius & Hollister LLP (57) ABSTRACT

A powder application arrangement for use in an apparatus for manufacturing work pieces by irradiating powder layers with electromagnetic radiation or particle radiation, the powder application arrangement comprises a carrier adapted to receive layers of a raw material powder and a work piece made of the raw material powder by a generative layer construction method. The powder application arrangement further includes a powder application device configured to deposit the raw material powder onto the carrier At least one camera is attached to the powder application device in such a position that it is capable of acquiring images of at least one of a surface of a raw material powder layer applied onto the carrier by means of the powder application device and a surface of the work piece made of the raw material powder by a generative layer construction method while the powder application device is moved across the carrier.

18 Claims, 3 Drawing Sheets

(51) Int. Cl.
*B33Y 50/02* (2015.01)
*B22F 3/105* (2006.01)
*B33Y 10/00* (2015.01)
*B29C 64/153* (2017.01)
*B28B 1/00* (2006.01)

(52) U.S. Cl.
CPC ....... *B22F 2003/1056* (2013.01); *B28B 1/001* (2013.01); *Y02P 10/25* (2015.11)

(58) Field of Classification Search
USPC .......................................................... 264/412
See application file for complete search history.

(56) References Cited

U.S. PATENT DOCUMENTS

| | | |
|---|---|---|
| 2010/0031882 A1 | 2/2010 | Abe et al. |
| 2011/0061591 A1 | 3/2011 | Stecker |
| 2015/0165683 A1* | 6/2015 | Cheverton ............ G06T 7/0004 382/141 |
| 2017/0266727 A1* | 9/2017 | Nishino ............. G01B 11/2441 |

FOREIGN PATENT DOCUMENTS

| | | |
|---|---|---|
| DE | 102013214320 A1 | 1/2015 |
| EP | 2202016 B1 | 4/2012 |
| EP | 2818605 A1 | 12/2014 |
| EP | 2918395 A1 | 9/2015 |
| JP | 2010132960 A | 6/2010 |
| WO | 2016040453 A1 | 3/2013 |
| WO | WO-2016042794 A1 * | 3/2016 |

OTHER PUBLICATIONS

European Search Report, EP15190791.2, SLM Solutions Group AG, dated Apr. 29, 2016, 10 Pages.
Patent Office of the P.R. of China, English translation of Search Report in corresponding CN Application No. 2016109178615, dated Aug. 28, 2018, 2 pages.
European Patent Office, Official Action in corresponding EP Application No. 15190791.2, dated Nov. 14, 2018, 6 pages.
China National Intellectual Property Administration, Decision of Rejection in corresponding application No. 201610917861.5, dated Sep. 27, 2019, 8 pp.

* cited by examiner

POWDER APPLICATION ARRANGEMENT COMPRISING A CAMERA

TECHNICAL FIELD

The present invention relates to a powder application arrangement for use in an apparatus for manufacturing work pieces by irradiating powder layers with electromagnetic radiation or particle radiation. Further, the present invention relates to a method of operating such a powder application arrangement. Finally, the present invention is directed to an apparatus for manufacturing work pieces by irradiating powder layers with electromagnetic radiation or particle radiation which is equipped with such a powder application arrangement.

BACKGROUND

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopaedic prostheses, on the basis of CAD data.

A powder application device which may be used for applying raw material powder layers onto a carrier of an apparatus for manufacturing work pieces by irradiating powder layers with electromagnetic radiation or particle radiation is described in EP 2 818 305 A1. This powder application device comprises a powder storage for storing raw material powder and a powder supply channel which is configured to discharge raw material powder from the powder storage onto the carrier. A channel opening/closing element is provided in the powder supply channel and configured to be moved between a first position and a second position. In its first position, the channel opening/closing element allows the discharge of raw material powder from the powder storage onto the carrier, whereas, in its second position, the first channel opening/closing element prevents the discharge of raw material powder from the powder storage onto the carrier. The first channel opening/closing element is moved between its first and its second position by means of an external mechanical force which is caused by abutting the channel opening/closing element against a stopper of the device for manufacturing work pieces when moving the powder application apparatus over the carrier.

Furthermore, as disclosed in EP 2 202 016 B1, a powder application device for use in an apparatus for manufacturing work pieces by irradiating powder layers with electromagnetic radiation or particle radiation may be equipped with a leveling slider which is positionable relative to a powder outlet opening of the powder application device by vertical displacement between an idle position and an operating position. In its idle position, the leveling slider is not in contact with a raw material powder layer applied onto a carrier. To the contrary, in its operating position, the leveling slider sweeps across a raw material powder layer and levels the raw material powder, when the powder application device is moved across the carrier. Alternatively, the leveling slider may be positionable relative to the powder outlet opening by horizontal displacement between a first position and a second position such that it is always positionable relative to the powder outlet opening in such a manner that it sweeps across a raw material powder layer applied onto the carrier in order to level the raw material powder layer during operation of the powder application device, when the powder application device is moved across the carrier in opposite directions.

SUMMARY

It is an object of the present invention to provide a powder application arrangement for use in an apparatus for manufacturing work pieces by irradiating powder layers with electromagnetic radiation or particle radiation which allows a simple and reliable monitoring of the operation of the powder application arrangement and hence the quality of a three-dimensional work piece produced from raw material powder layers with the aid of the powder application arrangement. Further, it is an object of the present invention to provide a method of operating such a powder application arrangement. Finally, it is an object of the present invention to provide an apparatus for manufacturing work pieces by irradiating powder layers with electromagnetic radiation or particle radiation which is equipped with such a powder application arrangement.

These objects are addressed by a powder application arrangement as defined in claim 1, a method of operating a powder application arrangement as defined in claim 9 and an apparatus for manufacturing work pieces as defined in claim 15.

A powder application arrangement for use in an apparatus for manufacturing work pieces by irradiating powder layers with electromagnetic radiation or particle radiation comprises a carrier which is adapted to receive layers of a raw material powder and a work piece made of the raw material powder by a generative layer construction method. In principle, the carrier may be a rigidly fixed carrier. Preferably, however, the carrier is designed to be displaceable in a vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The powder application arrangement further comprises a powder application device which is configured to deposit the raw material powder onto the carrier. The powder application device is movable relative to the carrier. Specifically, the powder application device is movable back and forth across the carrier. The powder application device may be of any suitable design and may comprise a powder chamber for receiving and storing the raw material powder and a powder outlet opening for discharging the raw material powder from the powder chamber onto the carrier. For example, the powder application device may be designed as described in EP 2 818 305 A1. Furthermore, the powder application device may be equipped with a leveling slider as described in EP 2 202 016 B1 and hence may be suitable for operation without "blank runs". Alternatively, the powder application device may be designed without an integrated powder chamber and simply be configured to distribute separately discharged raw material powder on the carrier.

Finally, the powder application arrangement comprises at least one camera which is attached to the powder application device. Specifically, the camera is attached to the powder application device in such a position that it is capable of acquiring images of a surface of a raw material powder layer applied onto the carrier by means of the powder application device and/or a surface of the work piece made of the raw material powder by a generative layer construction method while the powder application device is moved across the carrier. By means of the camera, in situ monitoring of the surface of a fresh raw material powder layer applied onto the carrier by means of the powder application device and/or the surface of the work piece prior to being covered by a fresh raw material powder layer by means of the powder application device during operation of the powder application arrangement is made possible. Specifically, by means of the camera, the topography of the raw material powder layer surface and the work piece surface can be analyzed already upon moving the powder application device across the carrier. This allows a reliable control of the quality of a three-dimensional work piece produced from raw material powder layers with the aid of the powder application arrangement already during generation of the work piece.

The images acquired by means of the at least one camera may be transmitted to a control unit which may be adapted to perform image processing and/or image analysis for assessing the quality of the raw material powder layer and/or the work piece. Further, the images acquired by means of the at least one camera may be displayed on a display screen so as to allow an observation of the images by a user. In addition, the control unit may be adapted to stop the operation of powder application arrangement in case the images acquired by means of the at least one camera indicate that the quality of the raw material powder layer and/or the work piece is not satisfying.

The at least one camera may be designed in the form of a line camera which may be equipped with a line image sensor. The image sensor of the at least one camera may have a length which is adapted to the dimensions of the carrier in a direction parallel to the orientation of the image sensor, i.e. the length of the image sensor may correspond to the length of the carrier in a direction parallel to the orientation of the image sensor. A line camera is particularly suitable for acquiring distortion-free images of the surface of the raw material powder layer and/or the surface of the work piece at a high spatial resolution and at a high speed. Mathematical image processing for compensating perspective distortions thus can be dispensed with.

For example, the at least one camera may be attached to a front face or a back face of the powder application device. In case the camera is attached to the front face of the powder application device, the camera is suitable to acquire images of a surface in front of the moving powder application device, i.e. a surface of the work piece generated on the carrier before said surface is covered with a fresh layer of raw material powder. To the contrary, in case the camera is attached to the back face of the powder application device, the camera is suitable to acquire images of the surface behind the moving powder application device, i.e. a surface of a fresh raw material powder layer applied onto the carrier by means of the powder application device.

The powder application arrangement may further comprise at least one illumination device which is attached to the powder application device. Specifically, the at least one illumination device may be attached to the powder application device in such a position that it is capable of illuminating the surface of the raw material powder layer applied onto the carrier by means of the powder application device and/or the surface of the work piece made of the raw material powder by a generative layer construction method while the powder application device is moved across the carrier. By means of the illumination device, the surface of the raw material powder layer and/or the surface of the work piece which is intended to be monitored with the aid of the at least one camera may be illuminated. Thus, the quality of the images acquired by means of the at least one camera can be enhanced.

The at least one illumination device may be designed in the form of a line illumination device. The line illumination device may have a length which is adapted to the dimensions of the carrier in a direction parallel to the orientation of the line illumination device, i.e. the length of the line illumination device may correspond to the length of the carrier in a direction parallel to the orientation of the line illumination device in order to ensure proper illumination of the surface of the raw material powder layer and/or the surface of the work piece which is intended to be monitored with the aid of the at least one camera. The use of a line illumination device is particularly advantageous in combination with a camera designed in the form of a line camera.

For example, the at least one illumination device may be attached to the front face or the back face of the powder application device. In case the illumination device is attached to the front face of the powder application device, the illumination device is suitable to illuminate a surface in front of the moving powder application device, i.e. a surface of the work piece generated on the carrier before said surface is covered with a fresh layer of raw material powder. To the contrary, in case the illumination device is attached to the back face of the powder application device, the illumination device is suitable to illuminate the surface behind the moving powder application device, i.e. a surface of a fresh raw material powder layer applied onto the carrier by means of the powder application device.

In the powder application arrangement, the at least one camera and/or the at least one illumination device is exposed to dust formed by particles of the raw material powder which is applied onto the carrier by means of the powder application device. Therefore, the powder application arrangement preferably further comprises at least one cleaning station which is arranged so as to come into contact with the at least one camera and/or the at least one illumination device after the powder application device has completed a movement across the carrier and has reached a position of rest and which is adapted to clean the at least one camera and/or the at least one illumination device. In its position of rest, the powder application device preferably is arranged offset to the carrier in order to allow unhindered irradiation of the raw material powder layer applied onto the carrier by means of the powder application device with electromagnetic radiation particle radiation. For example, the powder application device, in its position of rest, may be arranged adjacent to the carrier and oriented in such a manner that a longitudinal axis of the powder application device extends substantially parallel to an edge of the carrier. Thus, the at least one cleaning station also may be arranged adjacent to the carrier and extend along an edge of the carrier so as to face the at least one camera and/or the at least one illumination device when the powder application device, after completing a movement across the carrier, is arranged in its position of rest.

The shape and the dimensions of at least one cleaning station preferably is adapted to the shape and the dimensions of the at least one camera and/or the at least one illumination device in order to ensure proper cleaning of the at least one camera and/or the at least one illumination device. For example, in case the at least one camera is designed in the form of a line camera and/or the at least one illumination device is designed in the form of a line illumination device, the at least one cleaning station preferably also is line-shaped and has a length which substantially corresponds to the length of the line camera and/or the line illumination device.

The at least one cleaning station may be provided with a cover that is movable between a closed position and an open position. While the powder application device with the at least one camera and/or the at least one illumination device being attached thereto is moved across the carrier, the cover preferably is arranged in its closed position so as to protect the cleaning station from being contaminated with raw material powder particles. The cover, however, may be adapted to be brought into its open position when the powder application device approaches the cleaning station. The at least one camera and/or the at least one illumination device then may be directly brought into contact with the cleaning station and cleaned after the powder application device has reached its position of rest.

Preferably, the contact between the cleaning station and the at least one camera and/or the at least one illumination device is maintained, i.e. the at least one camera and/or the at least one illumination device may remain accommodated within the cleaning station, as long as the powder application device is arranged in its position of rest. Specifically, the at least one camera and/or the at least one illumination device may remain accommodated within the cleaning station while the raw material powder layer applied onto the carrier by means of the powder application device during its most recent movement across the carrier is irradiated with electromagnetic radiation or particle radiation. As a result, the at least one camera and/or the at least one illumination device is protected from smoke and soot particles generated upon irradiating the raw material powder layer with electromagnetic radiation or particle radiation.

In a particularly preferred embodiment, the powder application arrangement comprises a first camera attached to the powder application device in such a position that it is capable of acquiring images of the surface of a raw material powder layer applied onto the carrier by means of the powder application device while the powder application device is moved across the carrier and a second camera attached to the powder application device in such a position that it is capable of acquiring images of the surface of the work piece made of the raw material powder by a generative layer construction method while the powder application device is moved across the carrier. With such a design of the powder application arrangement, simultaneous in situ monitoring of both the surface of a fresh raw material powder layer applied onto the carrier by means of the powder application device and the surface of the work piece prior to being covered with a fresh raw material powder layer by means of the powder application device during operation of the powder application arrangement is made possible.

Alternatively or additionally thereto, the powder application arrangement may comprise a first illumination device attached to the powder application device in such a position that it is capable of illuminating the surface of a raw material powder layer applied onto the carrier by means of the powder application device while the powder application device is moved across the carrier and a second illumination device attached to the powder application device in such a position that it is capable of illuminating the surface of the work piece made of the raw material powder by a generative layer construction method while the powder application device is moved across the carrier. With such a design of the powder application arrangement, simultaneous illumination of both the surface of the raw material powder layer which is intended to be monitored with the aid of the first camera and the surface of the work piece which is intended to be monitored with the aid of the second camera during operation of the powder application arrangement is made possible.

Furthermore, the powder application arrangement may comprise a first cleaning station which is arranged to come into contact with at least one of the first camera and the first illumination device after the powder application device has completed a movement across the carrier and has reached a first position of rest. The first cleaning station preferably is adapted to clean at least one of the first camera and the first illumination device. Moreover, the powder application arrangement may be equipped with a second cleaning station which is arranged to come into contact with at least one of the second camera and the second illumination device after the powder application device has completed a movement across the carrier and has reached a second position of rest. The second cleaning station preferably is adapted to clean at least one of the second camera and the second illumination device.

For example, the first cleaning station may be arranged adjacent to the carrier and may extend along a first edge of the carrier so as to face the first camera and/or the first illumination device when the powder application device, after completing a movement across the carrier in a first direction, is arranged in its first position of rest. The second cleaning station may be arranged adjacent to the carrier and may extend along a second edge of the carrier which is opposed to the first edge so as to face the second camera and/or the second illumination device when the powder application device, after completing a movement across the carrier in a second direction which is opposed to the first direction, is arranged in its second position of rest.

In a method of operating a powder application arrangement for use in an apparatus for manufacturing work pieces by irradiating powder layers with electromagnetic radiation or particle radiation, a carrier is provided which is adapted to receive layers of a raw material powder and a work piece made of the raw material powder by a generative layer construction method. A powder application device which is configured to deposite the raw material powder onto the carrier is moved back and forth across the carrier. The powder application device may comprise a powder chamber for receiving and storing the raw material powder and a powder outlet opening for discharging the raw material powder from the powder chamber onto the carrier. Alternatively, the powder application device may be designed without an integrated powder chamber and simply be configured to distribute separately discharged raw material powder on the carrier. Images of a surface of a raw material powder layer applied onto the carrier by means of the powder application device and/or a surface of the work piece made of the raw material powder by a generative layer construction method are acquired while the powder application device is moved across the carrier by means of at least one camera attached to the powder application device.

The surface of the raw material powder layer applied onto the carrier by means of the powder application device and/or the surface of the work piece made of the raw material powder by a generative layer construction method may be illuminated while the powder application device is moved across the carrier by means of at least one illumination device attached to the powder application device.

The camera and/or the illumination device may be cleaned by means of at least one cleaning station which is arranged so as to come into contact with the camera and/or the illumination device after the powder application device has completed a movement across the carrier and has reached a position of rest.

The at least one cleaning station may be provided with a cover that is movable between a closed position and an open position. Preferably, the cover is brought into its open position when the powder application device approaches the cleaning station.

In the method of operating a powder application arrangement, images of the surface of the raw material powder layer applied onto the carrier by means of the powder application device may be acquired while the powder application device is moved across the carrier by means of a first camera attached to the powder application device. Alternatively or additionally thereto, images of the surface of the work piece made of the raw material powder by a generative layer construction method may be acquired while the powder application device is moved across the carrier by means of a second camera attached to the powder application device.

The surface of the raw material powder layer applied onto the carrier by means of the powder application device may be illuminated while the powder application device is moved across the carrier by means of a first illumination device attached to the powder application device. Alternatively or additionally thereto, the surface of the work piece made of the raw material powder by a generative layer construction method may be illuminated while the powder application device is moved across the carrier by means of a second illumination device attached to the powder application device.

The first camera and/or the first illumination device may be cleaned by means of a first cleaning station which is arranged so as to come into contact with the first camera and/or the first illumination device after the powder application device has completed a movement across the carrier and has reached a position of rest. The second camera and/or the second illumination device may be cleaned by means of a second cleaning station which is arranged so as to come into contact with the second camera and/or the second illumination device after the powder application device has completed a movement across the carrier and has reached a position of rest.

An apparatus for manufacturing work pieces by irradiating powder layers with electromagnetic radiation or particle radiation comprises an above-described powder application arrangement.

BRIEF DESCRIPTION OF THE DRAWINGS

Preferred embodiments of the invention in the following are explained in greater detail with reference to the accompanying schematic drawing, in which.

DETAILED DESCRIPTION OF THE ILLUSTRATIVE EMBODIMENTS

Figure 1:
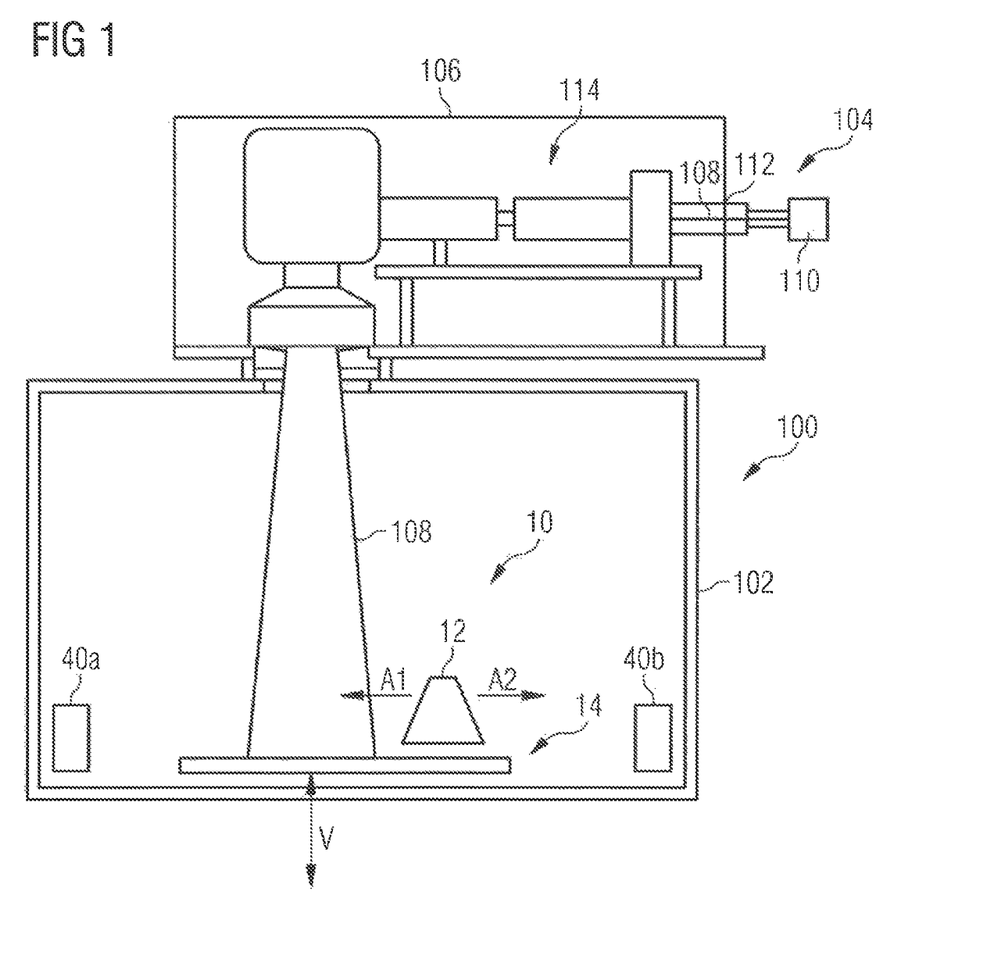
FIG. 1 shows an apparatus for producing three-dimensional work pieces by irradiating layers of a raw material powder with electromagnetic or particle radiation.

FIG. 1 shows an apparatus 100 for manufacturing a component by an additive layer construction method. The apparatus 100 comprises a process chamber 102 which accommodates a powder application arrangement 10. The process chamber 102 is sealable against the ambient atmosphere, i.e. against the environment surrounding the process chamber 102. The powder application arrangement 10 comprises a powder application device 12 which serves to apply a raw material powder onto a carrier 14. The powder application device 12 is movable back and forth across the carrier 14 as indicated by arrows A1, A2. The carrier 14 is designed to be displaceable in a vertical direction V so that, with increasing construction height of a component, as it is built up in layers from the raw material powder on the carrier 14, the carrier 14 can be moved downwards in the vertical direction V.

The apparatus 10 further comprises an irradiation device 104 for selectively irradiating laser radiation onto the raw material powder applied onto the carrier 14. By means of the irradiation device 104, the raw material powder applied onto the carrier 14 may be subjected to laser radiation in a site-selective manner in dependence on the desired geometry of the component that is to be produced. The irradiation device 104 has a hermetically sealable housing 106. A radiation beam 108, in particular a laser beam, provided by a radiation source 110, in particular a laser source which may, for example, comprise a diode pumped Ytterbium fibre laser emitting laser light at a wavelength of approximately 1070 to 1080 nm is directed into the housing 106 via an opening 112.

The irradiation device 104 further comprises an optical unit 114 for guiding and processing the radiation beam 108. The optical unit 114 may comprise a beam expander for expanding the radiation beam 108, a scanner and an object lens. Alternatively, the optical unit 114 may comprise a beam expander including a focusing optic and a scanner unit. By means of the scanner unit, the position of the focus of the radiation beam 108 both in the direction of the beam path and in a plane perpendicular to the beam path can be changed and adapted. The scanner unit may be designed in the form of a galvanometer scanner and the object lens may be an f-theta object lens.

During operation of the apparatus 100, a first layer of a component to be produced is generated on the carrier 14 by selectively irradiating the raw material powder layer applied onto the carrier 14 with the radiation beam 108. The radiation beam 108 is directed over the raw material powder layer applied onto the carrier 14 in accordance with CAD data of the component to be produced. After the first layer of the component to be produced is completed, the carrier 14 is lowered in a vertical direction allowing the application of a successive powder layer by means of the powder application device 12. Thereafter, the successive powder layer is irradiated by means of the irradiation device 104. Thus, layer by layer, the component is built up on the carrier 14.

Figure 2:
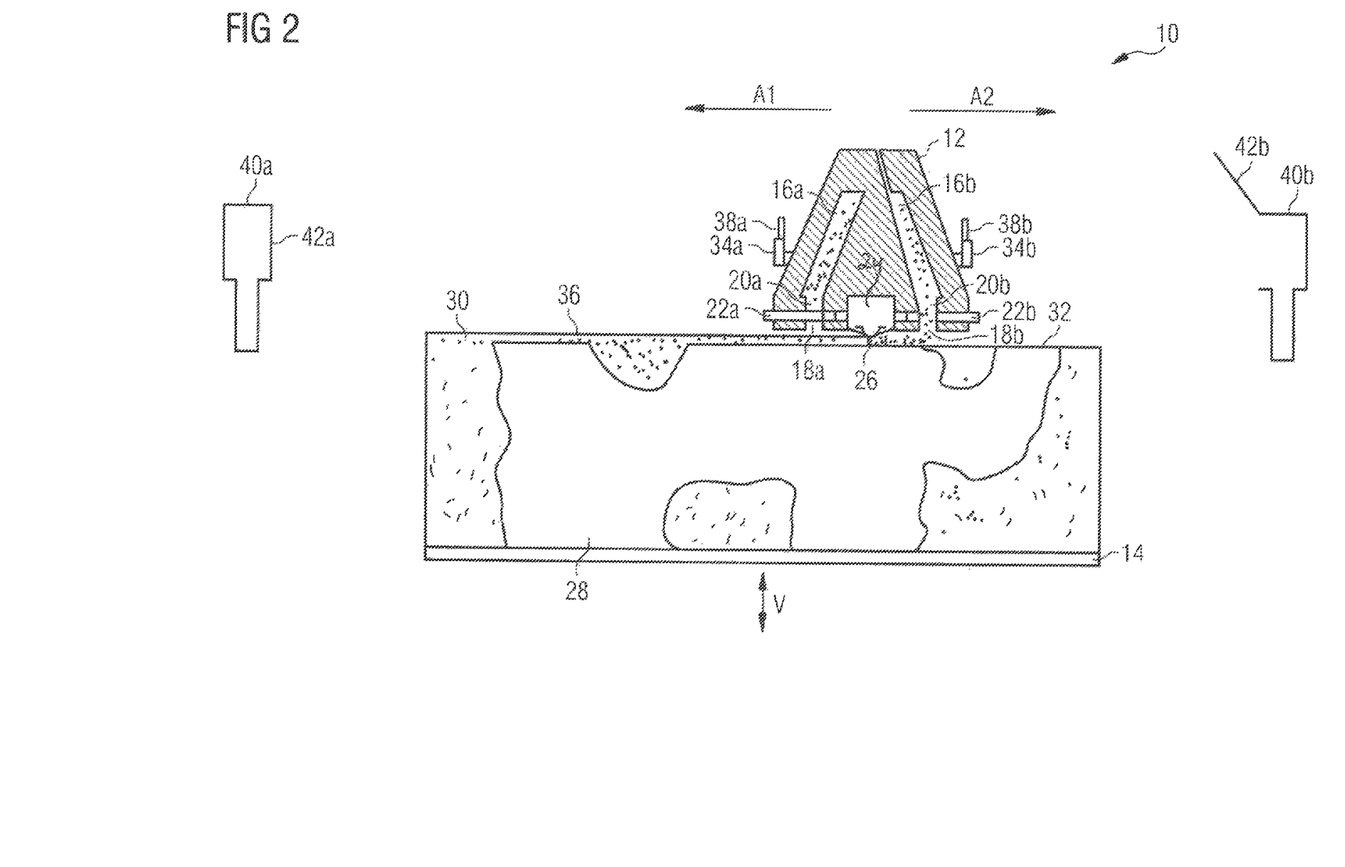
FIG. 2 shows a detailed sectional view of a powder application arrangement employed in the apparatus according to FIG. 1

As becomes apparent in particular from FIG. 2, the powder application device 12 comprises a first and a second powder chamber 16a, 16b for receiving and storing raw material powder to be applied onto the carrier 14. Each powder chamber 16a, 16b is connected to a respective first and second powder outlet opening 18a, 18b via a respective first and second powder supply channel 20a, 20b, A closing/opening element 22a, 22b is arranged in each powder supply channel 20a, 20b which is movable between a closed position and an open position and serves to selectively close or open the powder supply channel 20a, 20b. Specifically, in case the closing/opening elements 22a, 22b are arranged in their closed position, a discharge of raw material powder from the powder chambers 16a, 16b onto the carrier 14 via the powder outlet openings 18a, 18b is prevented. To the contrary, in case the closing/opening elements 22a, 22b are arranged in their open position, raw material powder is discharged from the powder chambers 16a, 16b onto the carrier 14 via the powder outlet openings 18a, 18b.

A holding element 24 with a leveling slider 26 releasably attached thereto is provided between the powder outlet openings 18a, 18b. When the powder application device 12 is moved across the carrier 14 in a first direction indicated by arrow A1 in FIG. 1, a first closing/opening element 22a is arranged in its open position whereas a second closing/opening element 22b is arranged in its closed position. Thus, raw material powder from the first powder chamber 16a is discharged onto the carrier 14 via the first powder outlet opening 18a, whereas the discharge of raw material powder from the second powder chamber 16b is prevented. The raw material powder applied onto the carrier 14 is leveled by means of the leveling slider 26 which, with respect to the moving direction A1 of the powder application device 12 across the carrier 14, is arranged behind the first powder outlet opening 18a which discharges the raw material powder onto the carrier 14.

To the contrary, when the powder application device 12 is moved across the carrier 14 in a second direction indicated by arrow A2 in FIG. 1, which is opposite to the first direction A1, the first closing/opening element 22a is arranged in its closed position, whereas the second closing/opening element 22b is arranged in its open position. Thus, raw material powder from the second powder chamber 16b is discharged onto the carrier 14 via the second powder outlet opening 18b, whereas the discharge of raw material powder from the first powder chamber 16a is prevented. The raw material powder applied onto the carrier 14 is again leveled by means of the leveling slider 26 which, with respect to the moving direction A2 of the powder application device 12 across the carrier 14, is arranged behind the second powder outlet opening 18b which discharges the raw material powder onto the carrier 14.

Figure 3:
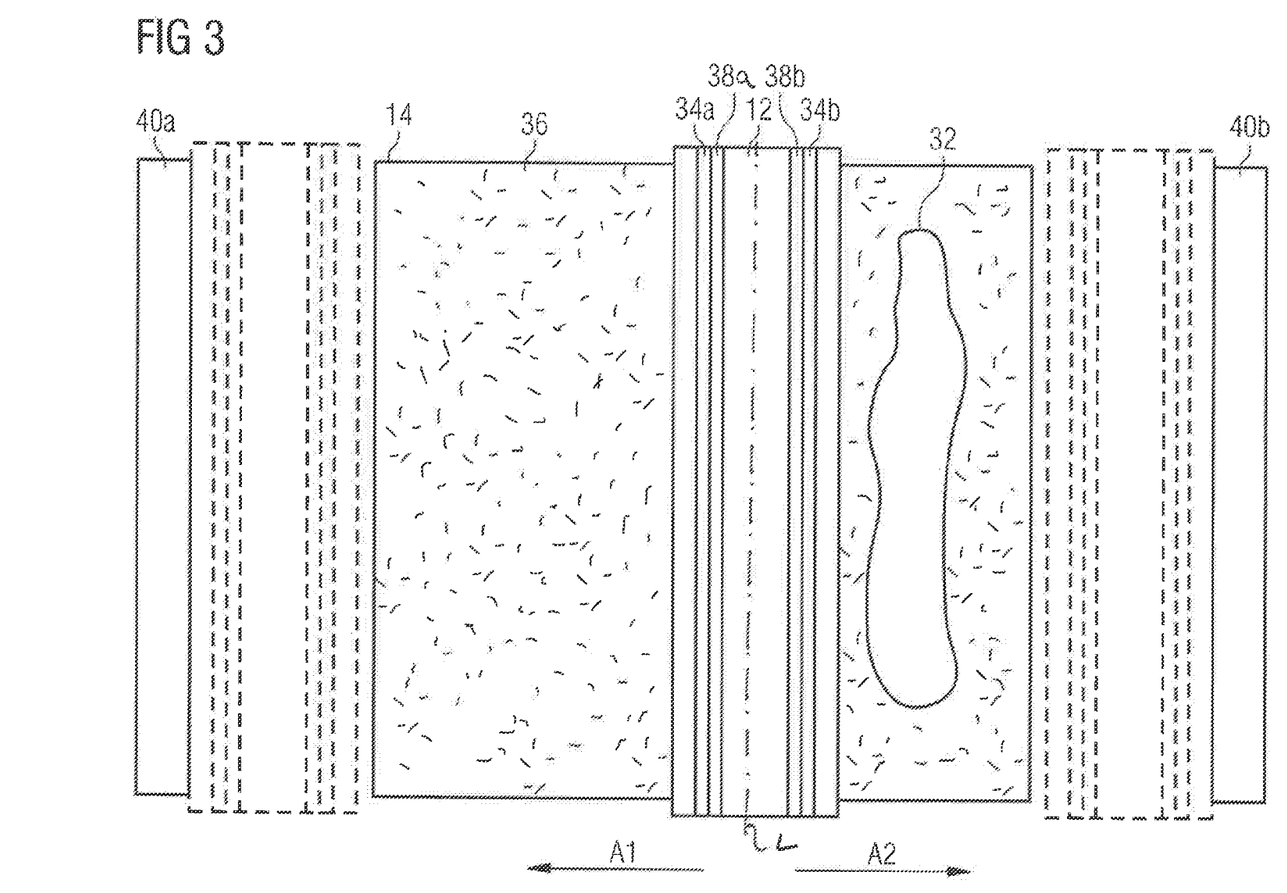
FIG. 3 shows a top view of the powder application arrangement according to FIG. 2.

FIGS. 2 and 3 show the powder application arrangement 10 in a state of operation wherein a three-dimensional work piece 28 already has been built up to a certain height on the carrier 14 which therefore has already been lowered in the vertical direction V. The work piece 28 is embedded within raw material powder 30. Furthermore, in FIGS. 2 and 3 the powder application device 12 is shown in a position halfway across the carrier 14 while being moved and the second moving direction A2. Thus, in a region which, with respect to the moving direction A2 of the powder application device 12 across the carrier 14, is arranged behind the second powder outlet opening 18b, the powder application device 12 already has applied a fresh raw material powder layer. To the contrary, in a region which, with respect to the moving direction A2 of the powder application device 12 across the carrier 14, is arranged in front of the second powder outlet opening 18b, a surface 32 of the work piece 28 is exposed.

The powder application arrangement 10 comprises at least one camera 34a, 34b which is attached to the powder application device 12 in such a position that it is capable of acquiring images of at least one of a surface 36 of the fresh raw material powder layer applied onto the carrier 14 by means of the powder application device 12 and the surface 32 of a work piece 28 made of the raw material powder 30 by a generative layer construction method while the powder application device 12 is moved across the carrier 14. Specifically, the powder application arrangement 10 comprises a first and a second camera 34a, 34b which are attached to the powder application device 12 in such a position that one of the first and the second camera 34a, 34b is capable of acquiring images of the surface 36 of the raw material powder layer applied onto the carrier 14 by means of the powder application device 12 while the powder application device 12 is moved across the carrier 14, whereas the other one of the first and the second camera 34a, 34b is capable of acquiring images of the surface 32 of the work piece 28 made of the raw material powder by a generative layer construction method while the powder application device 12 is moved across the carrier 14.

When the powder application device 12 according to FIGS. 2 and 3 is moved across the carrier 14 in the moving direction A2, the first camera 34a acquires images of the surface 36 of the fresh raw material powder layer applied onto the carrier 14 by means of the powder application device 12, whereas the second camera 34b acquires images of the still exposed surface 32 of the work piece 28. To the contrary, when the powder application device 12 according to FIGS. 2 and 3 is moved across the carrier 14 in the moving direction A1 opposite to the moving direction A2, the first camera 34a acquires images of the still exposed surface 32 of the work piece 28, whereas the second camera 34b acquires images of the fresh raw material powder layer applied onto the carrier 14 by means of the powder application device 12.

Both cameras 34a, 34b are designed in the form of line cameras and equipped with line image sensors. The image sensors of the cameras 34a, 34b have a length which is adapted to the dimensions of the carrier 14 in a direction parallel to the orientation of the image sensor, i.e. the length of the image sensors corresponds to the length of the carrier 14 in a direction parallel to the orientation of the image sensors. Relative to the moving direction A2, the first camera 34a is attached to the back face of the powder application device 12 and hence suitable to acquire images of the surface behind the moving powder application device, whereas the second camera 34b is attached to the front face of the powder application device 12 and hence suitable to acquire images of a surface in front of the moving powder application device 12. Of course, relative to the moving direction A1, the first camera 34a is attached to the front face of the powder application device 12 and hence suitable to acquire images of a surface in front of the moving powder application device 12, whereas the second camera 34b is attached to the back face of the powder application device 12 and hence suitable to acquire images of a surface behind the moving powder application device 12.

In order to enhance the quality of the images acquired by means of the cameras 34a, 34b, the powder application arrangement 10 further comprise at least one illumination device 38a, 38b which is attached to the powder application device 12 in such a position that it is capable of illuminating at least one of the surface 36 of the raw material powder layer applied onto the carrier 14 by means of the powder application device 12 and the surface 32 of the work piece 28 made of the raw material powder by a generative layer construction method while the powder application device 12 is moved across the carrier 14. Specifically, the powder application arrangement 10 comprises a first and a second illumination device 38a, 38b which are attached to the powder application device 12 in such a position that one of the first and the second illumination device 38a, 38b is capable of illuminating the surface 36 of the raw material powder layer applied onto the carrier 14 by means of the powder application device 12 while the powder application device 12 is moved across the carrier 14, whereas the other one of the first and the second illumination device 38a, 38b is capable of illuminating the surface 32 of the work piece 28 made of the raw material powder by a generative layer construction method while the powder application device 12 is moved across the carrier 14.

When the powder application device 12 according to FIGS. 2 and 3 is moved across the carrier 14 in the moving direction A2, the first illumination device 38a illuminates the surface 36 of the fresh raw material powder layer applied onto the carrier 14 by means of the powder application device 12, whereas the second illumination device 38b illuminates the still exposed surface 32 of the work piece 28. To the contrary, when the powder application device 12 according to FIGS. 2 and 3 is moved across the carrier 14 in the moving direction A1 opposite to the moving direction A2, the first illumination device 38a illuminates the still exposed surface 32 of the work piece 28, whereas the second illumination device 38b illuminates the fresh raw material powder layer applied onto the carrier 14 by means of the powder application device 12.

Both illumination devices 38a, 38b are designed in the form of line illumination devices which are arranged substantially parallel to the line cameras 34a, 34b. The illumination devices 38a, 38b have a length which is adapted to the dimensions of the carrier 14 in a direction parallel to the orientation of the illumination devices 38a, 38b and to the lengths of the line image sensors of the line cameras 34a, 34b in order to ensure proper illumination of the surface areas to be monitored with the aid of the cameras 34a, 34b.

Relative to the moving direction A2, the first illumination device 38a is attached to the back face of the powder application device 12 and hence suitable to illuminate the surface behind the moving powder application device, whereas the second illumination device 38b is attached to the front face of the powder application device 12 and hence suitable to illuminate a surface in front of the moving powder application device 12. Of course, relative to the moving direction A1, the first illumination device 38a is attached to the front face of the powder application device 12 and hence suitable to illuminate a surface in front of the moving powder application device 12, whereas the second illumination device 38b is attached to the back face of the powder application device 12 and hence suitable to illuminate a surface behind the moving powder application device 12.

In the apparatus 100, the cameras 34a, 34b and the illumination devices 38a, 38b are arranged within the process chamber 102 and hence are exposed to dust formed by particles of the raw material powder which is applied onto the carrier 14 by means of the powder application device 12. Therefore, the powder application arrangement 10 further comprises at least one cleaning station 40a, 40b which is arranged so as to come into contact with the at least one camera 34a, 34b and/or the at least one illumination device 38a, 38b after the powder application device 12 has completed a movement across the carrier 14 and has reached a position of rest and which is adapted to clean the at least one camera 34a, 34b and/or the at least one illumination device 38a. Specifically, the powder application arrangement 10 comprises a first cleaning station 40a which is arranged to come into contact with and clean the first camera 34a and the first illumination device 38a after the powder application device 12 has completed a movement across the carrier 14 and has reached a position of rest. Moreover, the powder application arrangement 10 is equipped with a second cleaning station 40b which is arranged to come into contact with and clean the second camera 34b and the second illumination device 38b after the powder application device 12 has completed a movement across the carrier 14 and has reached a position of rest.

As shown in FIG. 3 with dotted lines, after moving across the carrier 14 in the moving direction A1, the powder application device 12 is arranged in a first position of rest (on the left in FIG. 3), whereas, after moving across the carrier 14 in the moving direction A2, the powder application device 12 is arranged in a second position of rest (on the right in FIG. 3). In both positions of rest, the powder application device is arranged offset to the carrier 14 in order to allow unhindered irradiation of the raw material powder layer on the carrier 14. In particular, the powder application device 12, in both positions of rest, is arranged adjacent to the carrier 14 and oriented in such a manner that a longitudinal axis L of the powder application device 12 extends substantially parallel to an edge of the carrier 14.

Therefore, the first cleaning station 40a is arranged adjacent to the carrier 14 and extends along a first edge of the carrier 14 so as to face the first camera 34a and the first illumination device 38a when the powder application device 12, after completing a movement across the carrier 14 in the first moving direction A1, is arranged in its first position of rest. The second cleaning station 40b is arranged adjacent to the carrier 14 and extends along a second edge of the carrier 14 which is opposed to the first edge so as to face the second camera 34b and the second illumination device 38b when the powder application device 12, after completing a movement across the carrier in the second moving direction A2, is arranged in its second position of rest.

The shape and the dimensions of the cleaning stations 40a, 40b is adapted to the shape and the dimensions of the cameras 34a, 34b and the illumination devices 38a, 38b in order to ensure proper cleaning of the cameras 34a, 34b and the illumination devices 38a, 38b. In particular, cleaning stations 40a, 40b are also line-shaped and have a length which substantially corresponds to the length of the line cameras 34a, 34b and the line-shaped illumination devices 38a, 38b.

Each of the cleaning stations 40a, 40b may be provided with a cover 42a, 42b that is movable between a closed position (see the first cleaning station 40a in FIG. 2) and an open position (see the second cleaning station 40b in FIG. 2). While the powder application device 12 with the cameras 34a, 34b and the illumination devices 38a, 38b being attached thereto is moved across the carrier 14, the covers 42a, 42b are arranged in their closed position so as to protect the cleaning stations 40a, 40b from being contaminated with raw material powder particles. The covers 42a, 42b, however, may brought into their open position when the powder application device 12 approaches the cleaning station 40a, 40b. As a result, the cameras 34a, 34b and the illumination devices 38a, 38b can be directly brought into contact with the cleaning stations 40a, 40b and cleaned after the powder application device 12 has reached its position of rest.

The contact between the cleaning station 40a, 40b and the cameras 34a, 34b and the illumination devices 38a, 38b is maintained, i.e. the cameras 34a, 34b and the illumination devices 38a, 38b remain accommodated within the cleaning stations 40a, 40b as long as the powder application device 12 is arranged in its position of rest. Specifically, the cameras 34a, 34b and the illumination devices 38a, 38b remain accommodated within the cleaning stations 40a, 40b while the raw material powder layer on the carrier 14 is irradiated.

The images acquired by means of the cameras 34a, 34b are transmitted to a control unit (not shown) which is adapted to perform image processing and/or image analysis for assessing the quality of the raw material powder layer and/or the work piece 28. Further, the images acquired by means of the cameras 34a, 34b are displayed on a display screen (also not shown) so as to allow an observation of the images by a user. In addition, the control unit may be adapted to stop the operation of powder application arrangement 10 or to cause an additional powder discharge movement of the powder application device 12 in case the images acquired by means of the cameras 34a, 34b indicate that the quality of the raw material powder layer and/or the work piece 28 is not satisfying.

The invention claimed is:

1. A powder application arrangement for an apparatus for manufacturing work pieces by irradiating powder layers with electromagnetic radiation or particle radiation, the powder application arrangement comprising:
    a carrier adapted to receive layers of a raw material powder and a work piece made of the raw material powder by a generative layer construction method,
    a powder application device configured to deposit the raw material powder onto the carrier, the powder application device being movable back and forth across the carrier, the powder application device including a first powder outlet opening for discharging a fresh raw material powder while the powder application device is moved across the carrier in a first direction and a second powder outlet opening for discharging the fresh raw material powder while the powder application device is moved across the carrier in a second direction opposite the first direction,
    a first camera attached to the powder application device in such a position that it is capable of acquiring images of a surface of the fresh raw material powder layer applied onto the carrier by the powder application device from the second powder outlet opening while the powder application device is moved across the carrier in the second direction, and
    a second camera attached to the powder application device in such a position that it is capable of acquiring images of a surface of the fresh raw material powder from the first powder outlet opening while the powder application device is moved across the carrier in the first direction,
    wherein each of the first camera and the second camera is designed in the form of a line camera.

2. The powder application arrangement according to claim 1,
    wherein the first camera is attached to a front face of the powder application device and the second camera is attached to a back face of the powder application device.

3. The powder application arrangement according to claim 1, further comprising:
    at least one illumination device attached to the powder application device in such a position that it is capable of illuminating at least one of the surface of the raw material powder layer applied onto the carrier by the powder application device and the surface of the work piece made of the raw material powder by a generative layer construction method while the powder application device is moved across the carrier.

4. The powder application arrangement according to claim 3,
    wherein the at least one illumination device is designed in the form of a line illumination device and/or wherein the at least one illumination device is attached to a front face or a back face of the powder application device.

5. The powder application arrangement according to claim 1, further comprising:
    at least one cleaning station which is arranged so as to come into contact with at least one of the first and second cameras and the illumination device after the powder application device has completed a movement across the carrier and has reached a position of rest and which is adapted to clean at least one of the first and second cameras and the illumination device.

6. The powder application arrangement according to claim 5,
    wherein the at least one cleaning station is provided with a cover that is movable between a closed position and an open position, the cover being adapted to be brought into its open position when the powder application device approaches the cleaning station.

7. The powder application arrangement according to claim 1, comprising:
    a first illumination device attached to the powder application device in such a position that it is capable of illuminating the surface of a raw material powder layer applied onto the carrier by the powder application device while the powder application device is moved across the carrier and a second illumination device attached to the powder application device in such a position that it is capable of illuminating the surface of the work piece made of the raw material powder by a generative layer construction method while the powder application device is moved across the carrier.

8. The powder application arrangement according to claim 7, comprising:
    a first cleaning station which is arranged so as to come into contact with at least one of the first camera and the first illumination device after the powder application device has completed a movement across the carrier and has reached a first position of rest and which is adapted to clean at least one of the first camera and the first illumination device, and
    a second cleaning station which is arranged so as to come into contact with at least one of the second camera and the second illumination device after the powder application device has completed a movement across the carrier and has reached a second position of rest and which is adapted to clean at least one of the second camera and the second illumination device.

9. An apparatus for manufacturing work pieces by irradiating powder layers with electromagnetic radiation or particle radiation, the apparatus comprising the powder application arrangement according to claim 1.

10. A powder application arrangement for an apparatus for manufacturing work pieces by irradiating powder layers with electromagnetic radiation or particle radiation, the powder application arrangement comprising:
    a carrier adapted to receive layers of a raw material powder and a work piece made of the raw material powder by a generative layer construction method,
    a powder application device configured to deposit the raw material powder onto the carrier, the powder application device including a powder chamber adapted to receive and store the raw material powder and a powder outlet opening adapted to discharge the raw material powder from the powder chamber onto the carrier, the powder application device being movable back and forth across the carrier, a first camera attached to the powder application device to acquire images of a surface of a raw material powder layer applied onto the carrier by the powder application device while the powder application device is moved across the carrier, a second camera attached to the powder application device to acquire images of a surface of the work piece made of the raw material powder by the generative layer construction method while the powder application device is moved across the carrier, a process chamber sealed against the ambient atmosphere, and the carrier, the powder application device, the first camera, and the second camera are all located within the process chamber, at least one illumination device attached to the powder application device in such a position that it is capable of illuminating at least one of the surface of the raw material powder layer applied onto the carrier by the powder application device and the surface of the work piece made of the raw material powder by the generative layer construction method while the powder application device is moved across the carrier, and at least one cleaning station which is arranged so as to come into contact with at least one of the first and second cameras and the at least one illumination device after the powder application device has completed a movement across the carrier and has reached a position of rest and which is adapted to clean at least one of the first and second cameras and the at least one illumination device.

11. The powder application arrangement of claim 10, wherein the at least one illumination device comprises:

a first illumination device attached to the powder application device in such a position that it is capable of illuminating the surface of the raw material powder layer applied onto the carrier by the powder application device while the powder application device is moved across the carrier, and a second illumination device attached to the powder application device in such a position that it is capable of illuminating the surface of the work piece made of the raw material powder by the generative layer construction method while the powder application device is moved across the carrier.

12. The powder application arrangement of claim 11, further comprising:

a first cleaning station which is arranged so as to come into contact with at least one of the first camera and the first illumination device after the powder application device has completed a movement across the carrier and has reached a first position of rest and which is adapted to clean at least one of the first camera and the first illumination device, and a second cleaning station which is arranged so as to come into contact with at least one of the second camera and the second illumination device after the powder application device has completed a movement across the carrier and has reached a second position of rest and which is adapted to clean at least one of the second camera and the second illumination device.

13. The powder application arrangement of claim 10, wherein the at least one cleaning station is provided with a cover that is movable between a closed position and an open position, the cover being brought into its open position when the powder application device approaches the cleaning station.

14. The powder application arrangement of claim 10, wherein the powder outlet opening includes a first powder outlet opening and a second powder outlet opening, and the first camera is attached to the powder application device adjacent the first powder outlet opening to acquire images of the surface of the raw material powder layer deposited from the second powder outlet opening while the powder application device is moved across the carrier in a first direction, and the second camera is attached to the powder application device adjacent the second powder outlet opening to acquire images of the surface of the raw material powder layer deposited from the first powder outlet opening while the powder application device is moved across the carrier in a second direction opposite the first direction.

15. A powder application arrangement for an apparatus for manufacturing work pieces by irradiating powder layers with electromagnetic radiation or particle radiation, the powder application arrangement comprising:

a carrier adapted to receive layers of a raw material powder and a work piece made of the raw material powder by a generative layer construction method, a powder application device configured to deposit the raw material powder onto the carrier, the powder application device including a powder chamber adapted to receive and store the raw material powder and a powder outlet opening adapted to discharge the raw material powder from the powder chamber onto the carrier, the powder application device being movable back and forth across the carrier, the powder application device having a first face and a second face arranged opposite the first face, a first camera attached to the first face of the powder application device to acquire images of a surface of a raw material powder layer applied onto the carrier by the powder application device while the powder application device is moved across the carrier, a second camera attached to the second face of the powder application device to acquire images of a surface of the work piece made of the raw material powder by the generative layer construction method while the powder application device is moved across the carrier, a process chamber sealed against the ambient atmosphere, and the carrier, the powder application device, the first camera attached to the first face of the powder application device, and the second camera attached to the second face of the powder application device, are all located within the process chamber, a first illumination device attached to the first face of the powder application device in such a position that it is capable of illuminating the surface of the raw material powder layer applied onto the carrier by the powder application device while the powder application device is moved across the carrier, a second illumination device attached to the second face of the powder application device in such a position that it is capable of illuminating the surface of the work piece made of the raw material powder by the generative layer construction method while the powder application device is moved across the carrier, a first cleaning station which is arranged so as to come into contact with at least one of the first camera and the first illumination device after the powder application device has completed a movement across the carrier and has reached a first position of rest and which is adapted to clean at least one of the first camera and the first illumination device, and a second cleaning station which is arranged so as to come into contact with at least one of the second camera and the second illumination device after the powder application device has completed a movement across the carrier and has reached a second position of rest and which is adapted to clean at least one of the second camera and the second illumination device.

16. The powder application arrangement of claim 15, wherein:

the first cleaning station is provided with a cover that is movable between a closed position and an open position, the cover being brought into its open position when the powder application device approaches the first cleaning station, and the second cleaning station is provided with a cover that is movable between a closed position and an open position, the cover being brought into its open position when the powder application device approaches the second cleaning station.

17. The powder application arrangement of claim 15, wherein the powder application device is arranged offset to the carrier in each of the first and second positions of rest to allow unhindered irradiation of the raw material powder layer applied onto the carrier by the powder application device.

18. The powder application arrangement of claim 15, wherein the powder outlet opening includes a first powder outlet opening and a second powder outlet opening, and the first camera is attached to the first face of the powder application device adjacent the first powder outlet opening to acquire images of the surface of the raw material powder layer deposited from the second powder outlet opening while the powder application device is moved across the carrier in a first direction, and the second camera is attached to the second face of the powder application device adjacent the second powder outlet opening to acquire images of the surface of the raw material powder layer deposited from the first powder outlet opening while the powder application device is moved across the carrier in a second direction opposite the first direction.

* * * * *